US012307315B2

(12) United States Patent
Coleman

(10) Patent No.: US 12,307,315 B2
(45) Date of Patent: *May 20, 2025

(54) TRANSACTION CARD INCORPORATING ALUMINUM ALLOYS

(71) Applicant: American Express Travel Related Services Company, Inc., New York, NY (US)

(72) Inventor: James Bruce Coleman, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/644,922

(22) Filed: Apr. 24, 2024

(65) Prior Publication Data

US 2024/0273330 A1  Aug. 15, 2024

Related U.S. Application Data

(63) Continuation of application No. 18/321,647, filed on May 22, 2023, now Pat. No. 11,995,494, which is a continuation of application No. 17/335,608, filed on Jun. 1, 2021, now Pat. No. 11,710,022.

(51) Int. Cl.
| | | |
|---|---|---|
| *G06K 19/077* | (2006.01) | |
| *B32B 15/20* | (2006.01) | |
| *B32B 27/30* | (2006.01) | |
| *B32B 43/00* | (2006.01) | |
| *G06K 19/07* | (2006.01) | |

(52) U.S. Cl.
CPC ........ *G06K 19/07722* (2013.01); *B32B 15/20* (2013.01); *B32B 27/304* (2013.01); *B32B 43/003* (2013.01); *G06K 19/0723* (2013.01); *B32B 2425/00* (2013.01)

(58) Field of Classification Search
CPC .......... G06K 19/07722; G06K 19/0723; B32B 15/20; B32B 27/304
USPC ....................................................... 235/488
See application file for complete search history.

(56) References Cited

U.S. PATENT DOCUMENTS

| | | | | |
|---|---|---|---|---|
| 2009/0294543 | A1* | 12/2009 | Varga | G06K 19/06196 235/492 |
| 2015/0339564 | A1* | 11/2015 | Herslow | B32B 15/20 156/60 |
| 2016/0171356 | A1* | 6/2016 | Blum | G06K 19/07722 216/65 |
| 2019/0073578 | A1* | 3/2019 | Lowe | G06K 19/02 |

(Continued)

FOREIGN PATENT DOCUMENTS

| | | |
|---|---|---|
| JP | 2004-220305 A | 8/2004 |
| JP | 2017-525601 A2 | 9/2017 |
| WO | 2015179639 A1 | 11/2015 |

*Primary Examiner* — Allyson N Trail
(74) *Attorney, Agent, or Firm* — Thomas Horstemeyer, LLP

(57) ABSTRACT

Disclosed are examples of transaction cards incorporating aluminum or aluminum alloys. The aluminum can be extracted or recycled from a retired aircraft. Other materials can also be incorporated into the transaction card to provide sufficient weight and rigidity to the transaction card. Stainless-steel can be incorporated into the construction of the card in combination with aluminum to provide a desired user experience.

20 Claims, 4 Drawing Sheets

(56) References Cited

U.S. PATENT DOCUMENTS

| | | | |
|---|---|---|---|
| 2019/0144972 A1* | 5/2019 | Zhang | C22C 1/026 |
| | | | 148/550 |
| 2019/0329583 A1* | 10/2019 | Herrington | G06K 19/07722 |
| 2019/0382572 A1* | 12/2019 | Matayoshi | C08J 9/08 |
| 2020/0081463 A1* | 3/2020 | Son | B05B 12/10 |
| 2021/0095360 A1* | 4/2021 | Zhang | C22C 1/026 |
| 2021/0110231 A1 | 4/2021 | David | |
| 2022/0040649 A1* | 2/2022 | Peterman | B01F 35/21111 |
| 2022/0083830 A1* | 3/2022 | Vaccarello | G06K 19/041 |

* cited by examiner

TRANSACTION CARD INCORPORATING ALUMINUM ALLOYS

CROSS-REFERENCE TO RELATED APPLICATIONS

This application is a continuation of, and claims priority to and the benefit of, co-pending U.S. patent application Ser. No. 18/321,647, entitled "TRANSACTION CARD INCORPORATING ALUMINUM ALLOYS" and filed on May 22, 2023, which is a continuation of, and claims priority to and the benefit of, U.S. Pat. No. 11,710,022, entitled "TRANSACTION CARD INCORPORATING ALUMINUM ALLOYS" and filed on Jun. 1, 2021, which is incorporated by reference as if set forth herein in its entirety.

BACKGROUND

Typical transaction cards, such as credit cards, are made from thermoplastic materials, such as polyvinyl chloride (PVC) and polyethylene terephthalate (PET). However, plastic cards are susceptible to damage in certain environments. Additionally, thermoplastic transaction cards can be easily bent, broken, or cut, thereby damaging the transaction card and rendering it unusable. Furthermore, in a competitive credit card marketplace where card issuers fiercely compete to attract and retain customers, card issuers choose to issue cards made of different materials to offer a differentiated or premium user experience.

Some card issuers provide transaction cards to its customers that are fabricated with different types of materials, such as metal and/or metal alloys to provide more durability as well as a premium user experience. As the availability of metal cards from various card issuers continues to increase, issuers may search for additional, differentiated ways to offer a premium user experience as well as the durability benefits of metal cards.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
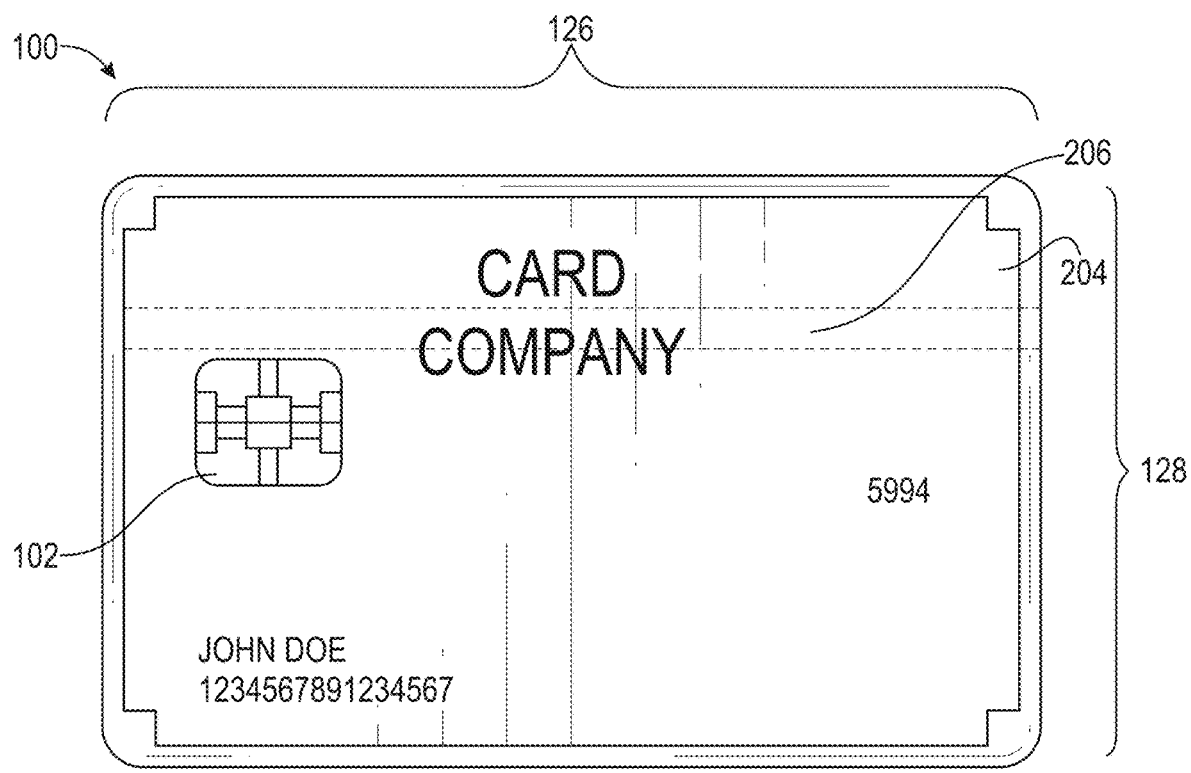
FIG. 1 is a drawing of an example transaction card according to examples of the disclosure.

Examples of the disclosure relate to fabricating transaction cards, such as charge cards, credit cards, or debit cards, from aluminum or aluminum alloys. In one example, aircraft grade aluminum can be extracted from a retired aircraft and repurposed into a transaction card. In this scenario, a customer can be provided with a metal transaction card that incorporates a portion of a particular aircraft, which can offer a differentiated or premium user experience. For example, the card issuer can market to customers aspects of the heritage, history, and service of an aircraft and the fact that a transaction card issued to the customer is made from the actual airframe of the aircraft. Additionally, in a scenario in which card issuers offer transaction cards that are co-branded with an airline, such a transaction card can offer a differentiated and premium customer experience. Such an experience can be desirable for card issuers and airlines that seek to attract and retain highly sought-after customers who frequently travel with an airline and utilize a co-branded transaction card for a considerable amount of spending.

As aircraft reach the end of their useful lives, they are often retired and the materials utilized to manufacture and maintain the aircraft can be recycled. Certain aircraft have a strong emotional connection to the customer base of airlines or aviation enthusiasts. For example, the BOEING 747™ and its variants were affectionately referred to by the public as the "Jumbo Jet" or the "Queen of the Skies." Examples of this disclosure are directed to transactions cards, and methods of fabricating transaction cards, that incorporate aluminum or aluminum alloys that are extracted or recycled from retired aircraft such as the 747.

Fabricating a transaction card using aircraft grade aluminum presents various challenges to a card fabricator. Aluminum is a relatively lightweight metal in comparison to titanium or stainless-steel, making it suitable for use in aircraft. However, a lightweight metal utilized in a transaction card may not possess a desired degree of weight or heft for a premium user experience. In one example, the weight of a transaction card according to examples of the disclosure can range from approximately 13 grams to 19 grams. Accordingly, example transaction cards of this disclosure can utilize recycled aluminum from an airframe but can also include other materials to provide a heavier, premium feel.

Additionally, aluminum is a relatively malleable metal that does not possess a great degree of elasticity. Accordingly, constructing a transaction card entirely or almost entirely from aluminum or recycled aluminum could result in a card that bends too easily and does not return to its original shape, which could result in a poor user experience. Therefore, examples of this disclosure are directed to fabrication of a transaction card that incorporates aluminum or aluminum alloys that can be recycled from aircraft materials, where the transaction card also possesses an acceptable weight and elasticity to provide an acceptable user experience to a customer.

Referring next to FIG. 1, shown is a top plan view of a transaction card 100 according to examples of the disclosure. FIG. 1 illustrates a transaction card 100 with a card face 204. The transaction card 100 can be composed of a card body which may comprise any material disclosed herein. The transaction card 100 can be fabricated with a width 126 and height 128 that are compliant with International Standards Organization (ISO) standard ISO 7810 ID-1 card format. The ID-1 card format specifies a size of approximately 85.60×53.98 mm (3⅜ inches×2⅛ inches) and rounded corners with a radius of 2.88-3.48 mm (approximately ⅛ inches). The format further specifies a thickness of approximately 0.76 mm. The card format can also provide a margin of error from these dimensions, such as +/−10%.

Additionally, the ID-1 format specifies other physical characteristics of a card that complies with the format, including bending stiffness, flammability, toxicity, resistance to chemicals, dimensional stability, adhesion or blocking, warpage, resistance to heat, surface distortions, and contamination. The card face 204 can be printed using ink on a polyvinyl chloride (PVC) surface. The card face 204 can also be coated with a diamond-like carbon (DLC) coating or lamination and include other features that are produced through marking, finishing, etching, and/or perforation. The card face 204 can also be finished with a matte or glossy surface. In some cases, the card face 204 can be polished to a glossy, highly reflective surface.

In some examples of the disclosure, the card face 204 can also be printed directly on an aluminum layer of the transaction card 100. The transaction card 100 can be constructed using various layers of different materials. In one scenario, an aluminum layer can be utilized as a top layer of the transaction card 100. In other examples, a PVC layer can be disposed atop an aluminum layer and the card face 204 printed on the PVC layer.

The card face 204 can also include an integrated circuit 102, which can comprise a chip or circuit that enables communication with a merchant payment terminal. The integrated circuit 102 can be a chip that complies with the Europay, Mastercard, and Visa (EMV) standard. The integrated circuit 102 can also be compliant with a different smart card or payment card standard. The integrated circuit 102 can be rested into a cavity formed in the card face 204. The integrated circuit 102 can be placed onto the card face 204 such that one or more contacts associated with the integrated circuit 102 are exposed so that electrical contact can be made with payment terminals that also implement EMV compliant.

The card face 204 can also include other features and card information, such as branding, an account number, an accountholder's name, a loyalty notation (e.g., "Member Since 2001"), an expiration date, a signature, a brand name, or other indicia such as legal notices, regulatory compliance messages, phone numbers, URLs, email addresses, trademarks, pictures, graphics, bar codes, credit card identification number (CCID) code or any alphanumeric characters.

Figure 2:
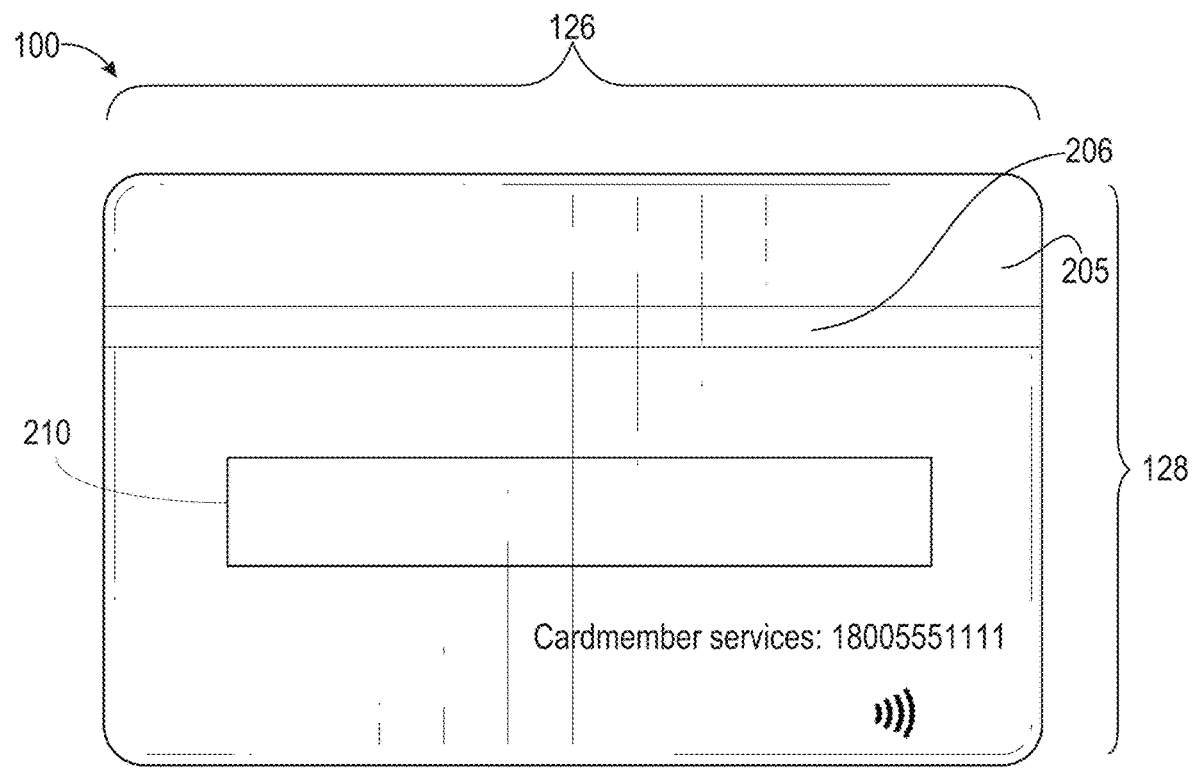
FIG. 2 is a drawing of an opposite side of the example transaction card according to examples of the disclosure.

FIG. 2 illustrates a card backing 205, or an opposite side of the transaction card 100 relative to the card face 204. The card backing 205 is also known as the rear of the transaction card 100. The card backing 205 can include a magnetic stripe 206. A magnetic stripe 206 can be mounted onto a card backing 205. The magnetic stripe 206 can be applied to a clear laminate layer that covers a printed PVC layer such that content printed onto the PVC layer is visible through the clear laminate layer.

For example, the PVC layer can have printed thereon various text, colors, branding, and other information, and a clear laminate layer on which the magnetic stripe 206 is applied can cover the rear PVC layer. The card backing 205 can also include a signature panel 210. A signature panel 210 can be etched or milled into the clear laminate surface on which the magnetic stripe 206 is applied.

As described in the subsequent drawings, the transaction card 100 according to the disclosure can incorporate aluminum, such as aluminum that is recycled from an airframe. The transaction card 100 can be constructed in various ways using various types of layers to provide a card that complies with the ID-1 standard and that also provides an acceptable user experience in terms of weight and rigidity of the card.

Figure 3:
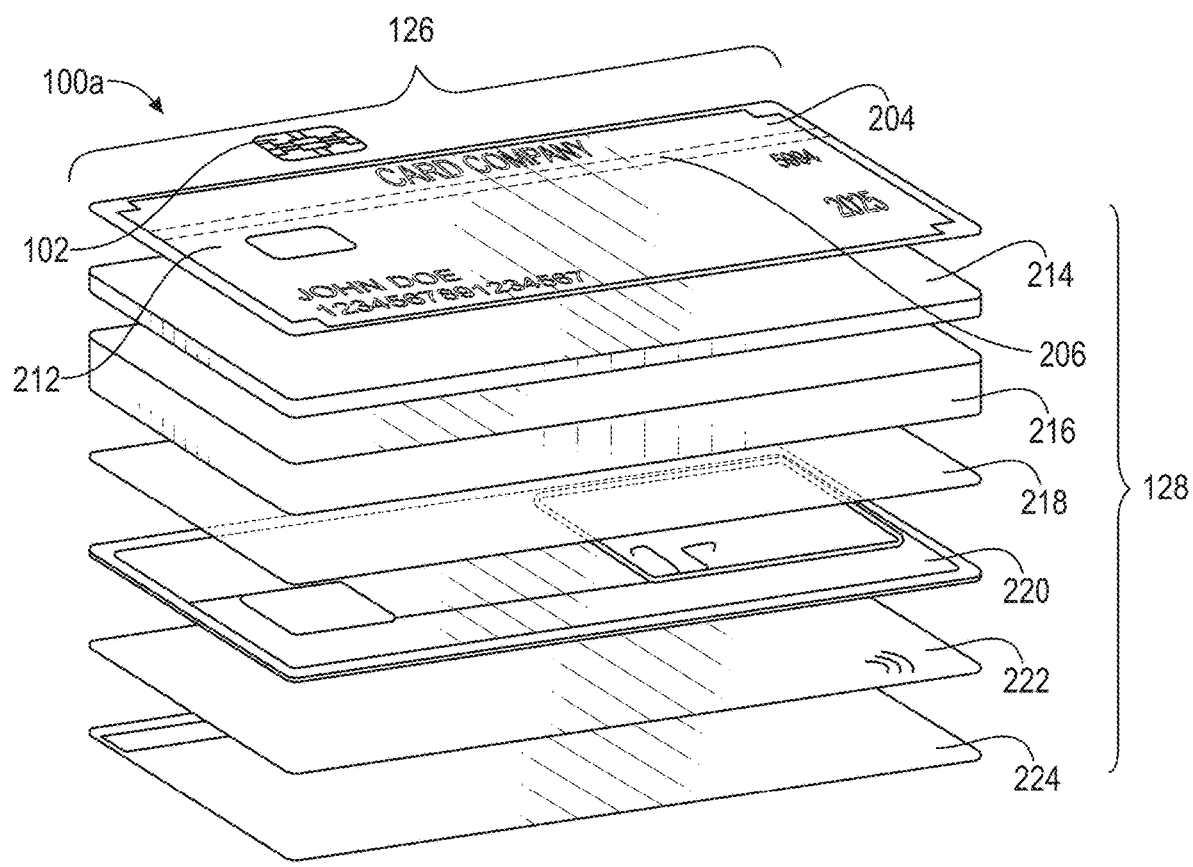
FIG. 3 is an exploded perspective view of an example transaction card according to examples of the disclosure.

Referring next to FIG. 3, shown is an exploded perspective view of a transaction card 100a according to examples of the disclosure. The transaction card 100a shown in FIG. 3 is not drawn to scale and is shown exploded into layers to illustrate the construction of the various layers that are utilized to form the transaction card 100a.

As noted above in the discussion of FIG. 1, the transaction card 100a can include an integrated circuit 102. The integrated circuit 102 can be rested into a cavity formed into the card or into a top layer of the transaction card 100a. In the example transaction card 100a shown in FIG. 3, the integrated circuit 102 is rested into a cavity formed in a PVC layer 212. The integrated circuit 102 can be secured to the PVC layer 212 or a layer beneath the PVC layer 212 using an adhesive to restrict the movement of the integrated circuit 102. In some implementations, an adhesive can be selected that insulates the integrated circuit 102 from a metal layer beneath the PVC layer 212. For example, ABLEBOND 931-1T1N1 may be used for this purpose. Further, in various examples, an insulating material may be disposed in a pocket for the integrated circuit 102 to be positioned between the integrated circuit 102 and the transaction card 100a.

The PVC layer 212 represents a layer on which images, text, branding, and other information can be printed. The PVC layer 212 can be printed upon using ink printing methodologies. In some examples, raised letter printing, etching, engraving, or other printing methodologies can also be employed to print content on the PVC layer 212. For example, laser etching or laser marking can be utilized to print a logo or other content onto the PVC layer 212. The PVC layer 212 can have a thickness of approximately 100-150 microns in some examples.

Adjacent to or beneath the PVC layer 212 is the aluminum layer 214. The aluminum layer 214 represents a layer of aluminum or aluminum alloy, such as aluminum or an aluminum alloy that can be extracted or recycled from a retired aircraft. For example, a Boeing 747 aircraft, which are increasingly reaching the end of their useful lives, can be retired. In some cases, parts and raw materials can be extracted or recycled from the retired aircraft. Accordingly, as certain aluminum alloys, such as 2024-T3 or various other aluminum alloys, are utilized to manufacture the exterior skin of the aircraft, these materials can be recycled.

Additionally, by recycling aircraft grade aluminum from an actual aircraft, a customer can be provided a transaction card 100 that possesses the heritage of an aircraft. In the case of a co-branded transaction card 100 that is offered in partnership with an airline, the aluminum can be recycled from a retired aircraft that was utilized by the airline so that the customers who are issued the transaction card 100 are offered a card with the heritage of an actual aircraft used by the airline. In this scenario, these customers are often high-value customers that exhibit a high degree of loyalty to the airline. Therefore, utilizing an aluminum layer 214 that is recycled from an aircraft in this way can offer a differentiated and premium user experience.

The PVC layer 212 and aluminum layer 214 can be adhered to one another using an adhesive or bonding process to secure the PVC layer 212 and the aluminum layer 214 to one another. The aluminum layer 214 can be formed to a thickness of approximately 100 microns. The thickness of the aluminum layer 214 can be chosen so that another layer of another material can be incorporated into the construction of the transaction card 100 while remaining within the overall thickness requirements specified by the ID-1 card format.

A stainless-steel layer 216 can be utilized on an opposing side of the aluminum layer 214 relative to the PVC layer 212. The stainless-steel layer 216 can be chosen to provide additional weight and rigidity the card. The stainless-steel layer 216 can be selected with a thickness of approximately 300 microns. In some implementations, the relative thickness of the aluminum layer 214 to the stainless-steel layer 216 can vary. In the example of FIG. 3, a three-to-one ratio of stainless-steel to aluminum in terms of thickness is utilized. A three-to-one ratio can be utilized so that the transaction card 100 uses aluminum but also includes stainless-steel to result in a card of sufficient weight, rigidity, and elasticity. However, other ratios can be utilized to vary the mechanical properties of the transaction card 100. Additionally, if a different aluminum alloy is chosen that provides more weight and rigidity, a different ratio can be selected. For example, aluminum alloy recycled from a different airframe may weigh more per square inch and have more rigidity. Accordingly, in this scenario, more aluminum can be utilized in the transaction card 100.

A ferrite layer 218 can be utilized on an opposing side of the stainless-steel layer 216 relative to the aluminum layer 214. The ferrite layer 218 can be chosen to block or attenuate signals from passing between integrated circuit 102 and layers of the transaction card 100a that are on an opposing side of the ferrite layer 218. In other words, the ferrite layer 218 can reduce or suppress electromagnetic interference between the integrated circuit 102 and an antenna layer 220. The ferrite layer 218 can have a thickness of approximately 100-150 microns in some examples.

The antenna layer 220 can include a near-field communication (NFC) or radio frequency identification (RFID) chip that can enable contactless payments on behalf of the transaction card 100a and communicate with a payment terminal on behalf of an integrated circuit 102 embedded in the transaction card 100a. The antenna layer 220 can be on an opposing side of the ferrite layer 218 relative to the stainless-steel layer 216. The antenna layer 220 can include a chip along with an antenna inlay that provides an antenna that is electrically connected to an NFC or RFID chip in the antenna layer 220. The antenna layer 220 can have a thickness of approximately 100-150 microns in some examples.

The rear PVC layer 222, or a second PVC layer, can have the transaction card 100 backing printed thereon. For example, text, branding, imagery, and other information can be printed on the rear PVC layer 222. A contactless payment logo, a phone number, legal information, and other information can be printed on the transaction card 100 backing as required by the transaction card issuer. The rear PVC layer 222 can be on an opposing side of the antenna layer 220 relative to the ferrite layer 218. The rear PVC layer 222 can have a thickness of approximately 100-150 microns in some examples.

A rear laminate layer 224 can be on an opposing side of the rear PVC layer 222 relative the antenna layer 220. The rear laminate layer 224 can be the layer of the transaction card 100 backing that is exposed to the elements. The rear laminate layer 224 can include the magnetic stripe onto which card information is encoded. The rear laminate layer 224 can also include a signature panel, if required by the transaction card 100 issuer. The signature panel can be etched or printed onto the rear laminate layer 224 to provide a surface that can accept an ink or pencil signature of a user. The rear laminate layer 224 can have a thickness of approximately 100-150 microns in some examples of the disclosure.

Figure 4:
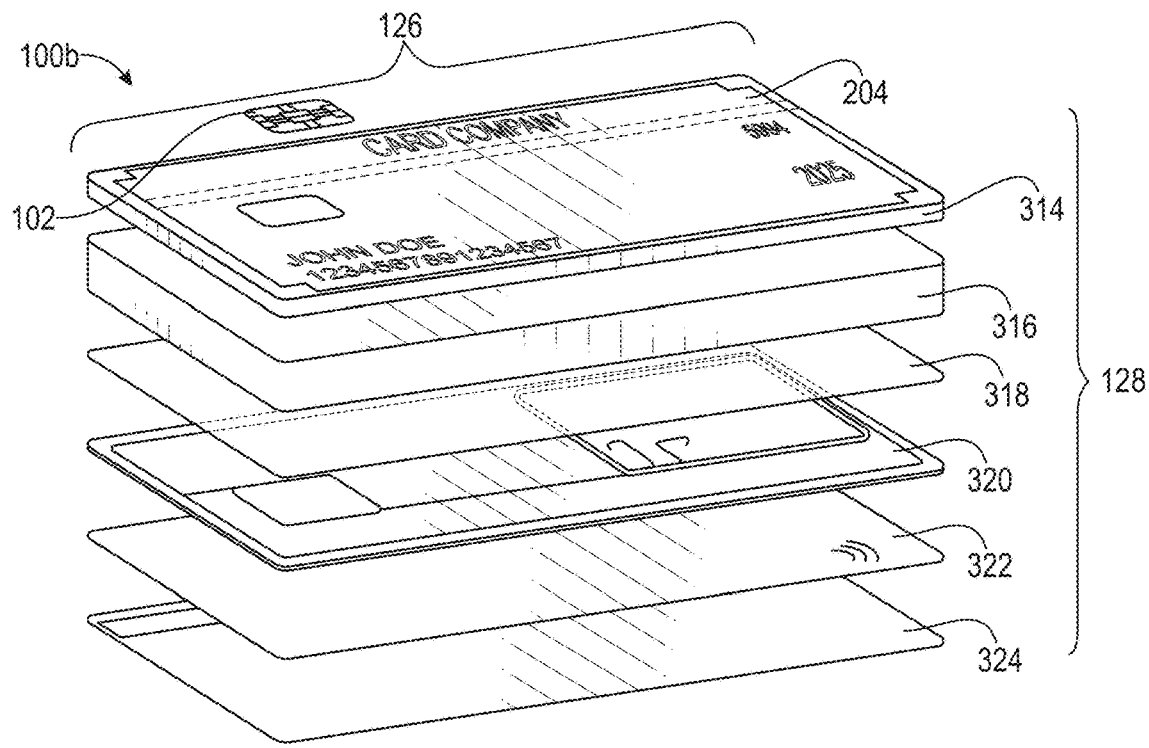
FIG. 4 is an exploded perspective view of an example transaction card according to examples of the disclosure.

Referring next to FIG. 4, shown is an exploded perspective view of an alternative implementation of a transaction card 100b according to examples of the disclosure. The transaction card 100b shown in FIG. 4 is not drawn to scale and is shown exploded into layers to illustrate the construction of the various layers that are utilized to form the transaction card 100b.

As noted above in the discussion of FIGS. 1 and 3, the transaction card 100b can include an integrated circuit 102. The integrated circuit 102 can be rested into a cavity formed into the card or into a top layer of the transaction card 100b. In the example transaction card 100b shown in FIG. 4, the integrated circuit 102 is rested into a cavity formed in an aluminum layer 314. The integrated circuit 102 can be secured to the aluminum layer 314 or a layer beneath the aluminum layer 314 using an adhesive to restrict the movement of the integrated circuit 102. In some implementations, an adhesive can be selected that insulates the integrated circuit 102 from a metal layer, such as a stainless-steel layer 316, that is beneath the aluminum layer 314. For example, ABLEBOND 931-1T1N1 may be used for this purpose.

In contrast to the example of FIG. 3, images, text, branding, and other information can be printed directly onto the aluminum layer 314 rather than on a PVC layer. The aluminum layer 314 can be printed upon using ink printing methodologies that provide for adhering ink onto an aluminum or metal surface. In some examples, raised letter printing, etching, engraving, or other printing methodologies can also be employed to print content on the aluminum layer 314. For example, laser etching or laser marking can be utilized to print a logo or other content onto the aluminum layer 314.

As in the example of FIG. 3, aluminum layer 314 represents a layer of aluminum or aluminum alloy, such as aluminum or an aluminum alloy, that can be extracted or recycled from a retired aircraft. As certain aluminum alloys, such as 2024-T3 or various other aluminum alloys, are utilized to manufacture the exterior skin of the aircraft, these materials can be recycled.

Additionally, by recycling aircraft grade aluminum from an actual aircraft, a customer can be provided a transaction card 100b that legitimately possesses the heritage of an aircraft. In the case of a co-branded transaction card 100b that is offered in partnership with an airline, the aluminum can be recycled from a retired aircraft that was utilized by the airline so that the customers who are issued the transaction card 100b are offered a card with the heritage of an actual aircraft used by the airline. In this scenario, these customers are often high-value customers that exhibit a high degree of loyalty to the airline. Therefore, utilizing an aluminum layer 314 that is recycled from an aircraft in this way can offer a differentiated and premium user experience.

The aluminum layer 314 can be formed to a thickness of approximately 100 microns. The thickness of the aluminum layer 314 can be chosen so that another layer of another material can be incorporated into the construction of the transaction card 100b while remaining within the overall thickness requirements specified by the ID-1 card format.

A stainless-steel layer 316 can be adhered to the aluminum layer 314. The stainless-steel layer 316 can be chosen to provide additional weight and rigidity the card. The stainless-steel layer 316 can be selected with a thickness of approximately 300 microns. In some implementations, the relative thickness of the aluminum layer 314 to the stainless-steel layer 316 can vary. In the example of FIG. 4, three-to-one ratio of stainless-steel to aluminum in terms of thickness is utilized. A three-to-one ratio can be utilized so that the transaction card 100 uses aluminum but also includes stainless-steel to result in a card of sufficient weight, rigidity, and elasticity. However, other ratios can be utilized to vary the mechanical properties of the transaction card 100b. Additionally, if a different aluminum alloy is chosen that provides more weight and rigidity, a different ratio can be selected. For example, aluminum alloy recycled from a different airframe may weigh more per square inch and have more rigidity. Accordingly, in this scenario, more aluminum can be utilized in the transaction card 100b.

A ferrite layer 318 can be utilized on an opposing side of the stainless-steel layer 216 relative to the aluminum layer 214. The ferrite layer 318 can be chosen to block or attenuate signals from passing between integrated circuit 102 and layers of the card that are on an opposing side of the ferrite layer 318. In other words, the ferrite layer 318 can reduce or suppress electromagnetic interference between the integrated circuit 102 and an antenna layer 320. The ferrite layer 318 can have a thickness of approximately 100-150 microns in some examples. The antenna layer 320 can include a near-field communication (NFC) or radio frequency identification (RFID) chip that can enable contactless payments on behalf of the transaction card 100b and communicate with a payment terminal on behalf of an integrated circuit 102 embedded in the transaction card 100b. The antenna layer 320 can be on an opposing side of the ferrite layer 318 relative to the stainless-steel layer 316. The antenna layer 320 can include a chip along with an antenna inlay that provides an antenna that is electrically connected to an NFC or RFID chip in the antenna layer 320. The antenna layer 320 can have a thickness of approximately 100-150 microns in some examples.

A rear PVC layer 322 can have the transaction card 100b backing printed thereon. For example, text, branding, imagery, and other information can be printed on the rear PVC layer 322. A contactless payment logo, a phone number, legal information, and other information can be printed on the transaction card 100b backing as required by the transaction card issuer. The rear PVC layer 322 can be on an opposing side of the antenna layer 320 relative to the ferrite layer 318. The rear PVC layer 322 can have a thickness of approximately 100-150 microns in some examples.

A rear laminate layer 324 can be on an opposing side of the rear PVC layer 322 relative the antenna layer 320. The rear laminate layer 324 can be the layer of the transaction card 100b backing that is exposed to the elements. The rear laminate layer 324 can include the magnetic stripe onto which card information is encoded. The rear laminate layer 324 can also include a signature panel, if required by the transaction card 100 issuer. The signature panel can be etched or printed onto the rear laminate layer 324 to provide a surface that can accept an ink or pencil signature of a user. The rear laminate layer 324 can have a thickness of approximately 100-150 microns in some examples.

Figure 5:
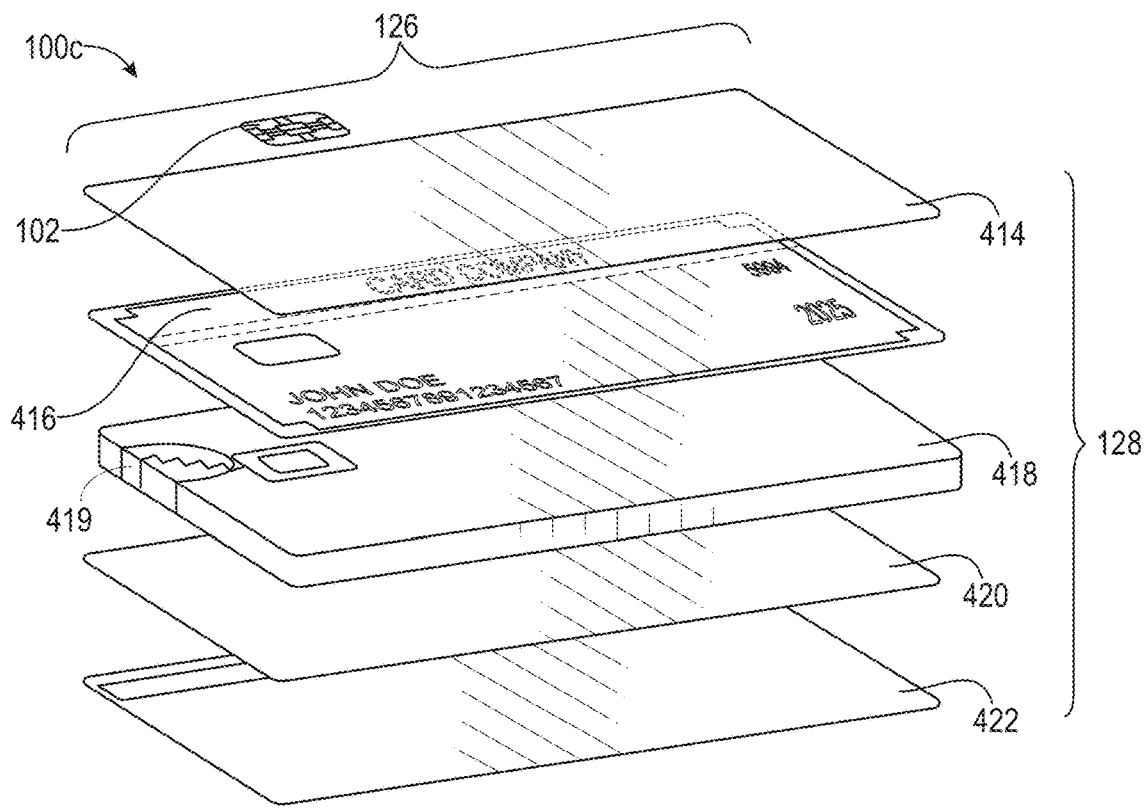
FIG. 5 is an exploded perspective view of an example transaction card according to examples of the disclosure.

Referring next to FIG. 5, shown is an exploded perspective view of an alternative implementation of a transaction card 100c according to examples of the disclosure. The transaction card 100c shown in FIG. 5 is not drawn to scale and is shown exploded into layers to illustrate the construction of the various layers that are utilized to form the transaction card 100c.

As noted above in the discussion of FIGS. 1 and 3-4, the transaction card 100c can include an integrated circuit 102. The integrated circuit 102 can be rested into a pocket that can be milled or otherwise formed into a top coating layer 414. The integrated circuit 102 can be secured to the top coating layer 414 or a layer beneath the top coating layer 414 using an adhesive to restrict the movement of the integrated circuit 102. In some examples, the top coating layer 414 can comprise a diamond-like carbon (DLC) layer. The top coating layer 414 can be deposited via physical vapor deposition (PVD). A DLC coating may be generally amorphous, though portions of a DLC coating may have a crystalline structure. For example, a DLC coating can include a mixture of forms of carbon, including graphite and diamond. In that regard, carbon in a DLC coating can contain hybridized carbon. The top coating layer 414 can be between 1 micron and 50 microns thick, between 2 microns and 25 microns thick, and between 2 microns and 15 microns thick.

Images, text, branding, and other information can be printed onto a PVC layer 416. The PVC layer 416 can be printed upon using ink printing methodologies that provide for adhering ink onto a PVC surface. In some examples, raised letter printing, etching, engraving, or other printing methodologies can also be employed to print content on the PVC layer 416. For example, laser etching or laser marking can be utilized to print a logo or other content onto the PVC layer 416.

The aluminum layer 418 can be adjacent to the PVC layer 416. The aluminum layer 418 can also represent the card body. The aluminum layer 418 represents a layer of aluminum or aluminum alloy that can be extracted or recycled from a retired aircraft. As certain aluminum alloys, such as 2024-T3 or various other aluminum alloys that are utilized to manufacture the exterior skin of the aircraft, these materials can be recycled.

The aluminum layer 418 can be formed to a thickness that is less than the thickness of the ID-1 card format as defined herein. In the example of FIG. 4, the thickness of the aluminum layer 418 can be chosen so that a bulk of the card body is comprised of aluminum, such as aluminum that is recycled from a retired aircraft.

Rather than utilizing a ferrite layer and a separate antenna layer as in the examples of FIGS. 3-4, a slot antenna assembly 419 can be utilized that integrates the antenna assembly and near-field communications (NFC) or radio-frequency identification (RFID) chip into the aluminum layer 418. The slot antenna design utilizes an angled slot that is cut into the card body, in this case the aluminum layer 418, that acts as an antenna. The design and operation of the slot antenna assembly 419 is further described in U.S. Pat. No. 10,909,436, which is incorporated herein by reference in its entirety.

A rear PVC layer 420 can have the transaction card 100c backing printed thereon. For example, text, branding, imagery, and other information can be printed on the rear PVC layer 420. A contactless payment logo, a phone number, legal information, and other information can be printed on the transaction card 100c backing as required by the transaction card issuer. The rear PVC layer 420 can be on an opposing side of the aluminum layer 418 relative to the PVC layer 416. The rear PVC layer 420 can have a thickness of approximately 100-150 microns in some examples.

A rear laminate layer 422 can be on an opposing side of the rear PVC layer 420 relative the aluminum layer 418. The rear laminate layer 422 can be the layer of the transaction card 100c backing that is exposed to the elements. The rear laminate layer 422 can include the magnetic stripe onto which card information is encoded. The rear laminate layer 422 can also include a signature panel, if required by the transaction card 100 issuer. The signature panel can be etched or printed onto the rear laminate layer 422 to provide a surface that can accept an ink or pencil signature of a user. The rear laminate layer 422 can have a thickness of approximately 100-150 microns in some examples.

Figure 6:
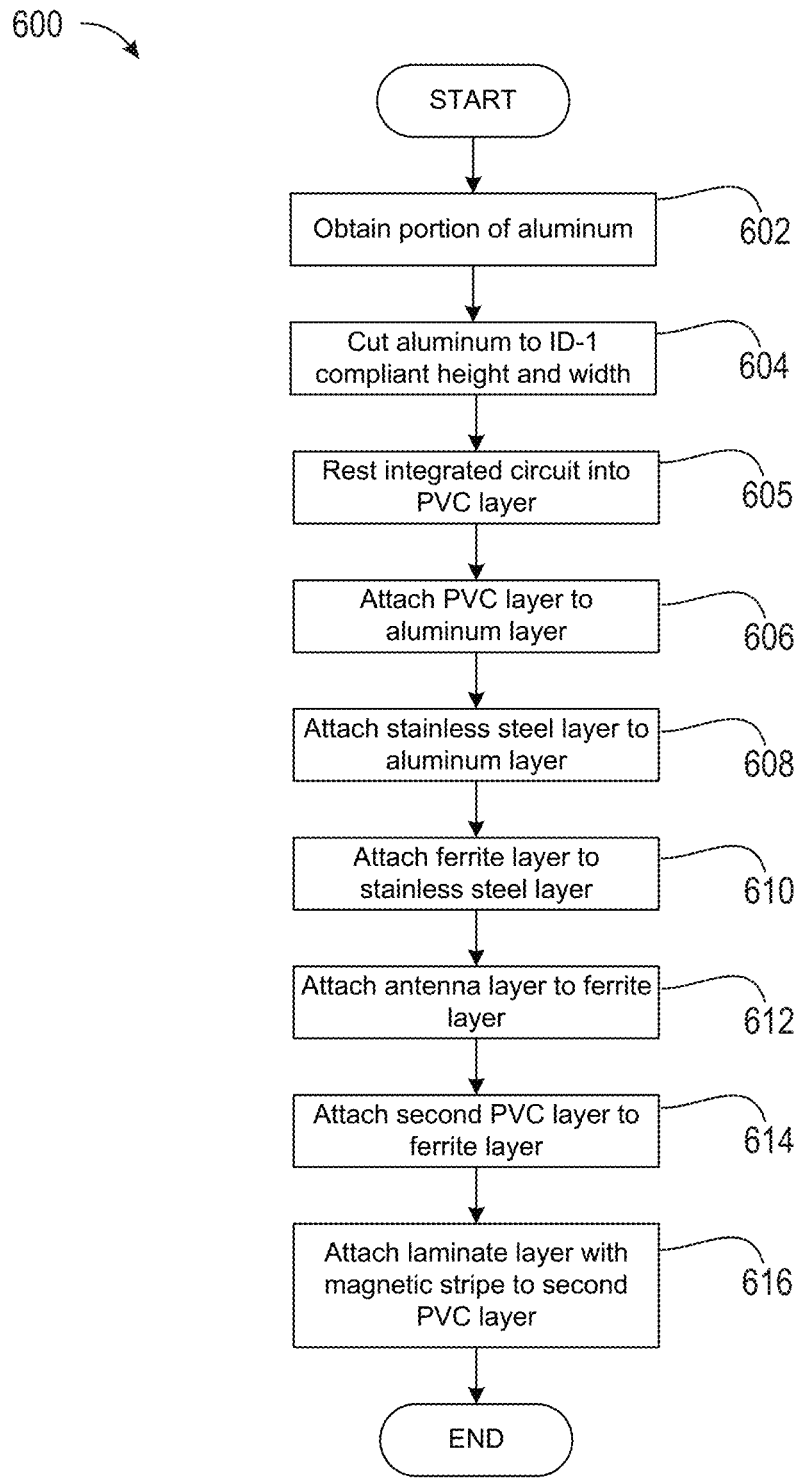
FIG. 6 is an example flowchart illustrating a process or method according to examples of the disclosure.

Referring next to FIG. 6, shown is a flowchart 600 that illustrates an example of fabricating a transaction card 100 according to examples of the disclosure. The flowchart 600 represents a process or method of fabricating a transaction card 100 according to examples of the disclosure.

First, at step 602, a portion of aluminum or aluminum alloy can be extracted from an aluminum source. In one example, the aluminum can be extracted or recycled from a retired airframe. As described above, aircraft can be retired and the materials used to manufacture them can be recycled. As certain aluminum alloys are utilized to manufacture the exterior skin or other portions of the aircraft, these materials can be recycled.

Further, by recycling aircraft grade aluminum from an actual aircraft, a customer can be provided a transaction card 100 that legitimately possesses the heritage of an aircraft. In the case of a co-branded transaction card 100 that is offered in partnership with an airline, the aluminum can be recycled from a retired aircraft that was utilized by the airline so that the customers who are issued the transaction card 100 are offered a card with the heritage of an actual aircraft used by the airline. In this scenario, these customers are often high-value customers that exhibit a high degree of loyalty to the airline.

To recycle aluminum from an aircraft, a portion of aluminum extracted from an aircraft can be cut into smaller sheets for processing and stripped of paint, contaminants, or other debris. The stripped aluminum can then be heated and sent through a roller to compress the aluminum to a desired thickness. The heating and rolling process can be repeatedly performed until the aluminum reaches a desired thickness, such as 100 microns. Once a desired thickness is reached, the aluminum can be annealed or tempered. In one example, the aluminum can be rolled to a thickness of less than 760 microns, which is the thickness specified to the ID-1 compliant thickness.

At step 604, a portion of aluminum that has the ID-1 compliant width 126 and height 128 can be cut from the annealed aluminum. The ID-1 compliant sized portion of aluminum can be utilized as an aluminum layer 214 in a transaction card 100.

At step 605, an integrated circuit 102 can be rested or placed into a cavity in a PVC layer 212. The integrated circuit 102 can be an EMV compliant chip that enables communication with EMV compliant payment terminals.

At step 606, a PVC layer 212 can be attached to the aluminum layer 214. The PVC layer 212 can be pre-printed with a card number, branding, and other text or imagery. In some cases, the PVC layer 212 can be printed after application to the aluminum layer 214. The PVC layer 212 can be attached to the aluminum layer 214 using an adhesive or bonding process or agent.

At step 608, a stainless-steel layer 216 can be attached to the aluminum layer 214. In one example, the stainless-steel layer 216 can be sized at approximately 300 microns in thickness with a height 128 and width 126 that are ID-1 compliant. The stainless-steel layer 216 and aluminum layer 214 can be attached to one another using an adhesive or bonding process or agent.

At step 610, a ferrite layer 218 can be attached to the stainless-steel layer 216. As noted above, the ferrite layer 218 can be utilized to attenuate or block electromagnetic interference (EMI) between the integrated circuit 102 and an NFC or RFID chip in an antenna layer 220.

At step 612, the antenna layer 220 can be attached to the ferrite layer 218. The antenna layer 220 includes an antenna assembly as well as a wireless integrated circuit to enable contactless payments. The integrated circuit can be inserted into the antenna layer 220 along with the antenna assembly. The wireless integrated circuit can include an RFID or NFC chip that can wirelessly communicate with a payment terminal implementing a contactless payment standard. The antenna layer 220 can include a chip along with an antenna inlay that provides an antenna that is electrically connected to an NFC or RFID chip in the antenna layer 220.

At step 614, a rear PVC layer 222 can be attached to the antenna layer 220. The rear PVC layer 222, or a second PVC layer, can have the card backing 205 printed thereon. For example, text, branding, imagery, and other information can be printed on the rear PVC layer 222. A contactless payment logo, a phone number, legal information, and other information can be printed on the card backing 205 as required by the transaction card issuer. The rear PVC layer 222 can be pre-printed before application to the antenna layer 220 or printed after application to the antenna layer 220.

At step 616, a rear laminate layer 224 can be attached to an opposing side of the rear PVC layer 222 relative the antenna layer 220. The rear laminate layer 224 can be the layer of the transaction card 100 backing that is exposed to the elements. The rear laminate layer 224 can include the magnetic stripe onto which card information is encoded. The rear laminate layer 224 can also include a signature panel, if required by the transaction card 100 issuer. The signature panel can be etched or printed onto the rear laminate layer 224 to provide a surface that can accept an ink or pencil signature of a user. Thereafter, the process can proceed to completion.

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some embodiments, one or more of the blocks shown in the drawings can be skipped or omitted.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X; Y; Z; X or Y; X or Z; X, Y, and/or Z; etc.). Thus, such disjunctive language is not generally intended to, and should not, imply that certain embodiments require at least one of X, at least one of Y, or at least one of Z to each be present.

It should be noted that measurements, amounts, and other numerical data can be expressed herein in a range format. It is also understood that there are a number of values disclosed herein, and that each value is also herein disclosed as "approximately" that particular value in addition to the value itself. For example, if the value "10" is disclosed, then "approximately 10" is also disclosed. Similarly, when values are expressed as approximations, by use of the antecedent "approximately," it will be understood that the particular value forms a further aspect. For example, if the value "approximately 10" is disclosed, then "10" is also disclosed.

As used herein, the terms "about," "approximately," "at or about," and "substantially equal" can mean that the amount or value in question can be the exact value or a value that provides equivalent results or effects as recited in the claims or taught herein. That is, it is understood that amounts, sizes, measurements, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In general, an amount, size, measurement, parameter or other quantity or characteristic is "about," "approximate," "at or about," or "substantially equal" whether or not expressly stated to be such. It is understood that where "about," "approximately," "at or about," or "substantially equal" is used before a quantitative value, the parameter also includes the specific quantitative value itself, unless specifically stated otherwise.

Where a range is expressed, a further aspect includes from the one particular value and/or to the other particular value. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

Such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A transaction card comprising:
   an aluminum layer;
   a stainless-steel layer adjacent to the aluminum layer;
   a first polyvinyl chloride layer (PVC) adjacent to the aluminum layer on an opposing side of the aluminum layer relative to the stainless-steel layer;
   a chip disposed within the first PVC layer; and
   a wireless integrated circuit disposed within an antenna layer, the antenna layer separated from the stainless-steel layer by a ferrite layer and wherein the chip is configured to wirelessly communicate with a payment terminal via the wireless integrated circuit.

2. The transaction card of claim 1, wherein the aluminum layer is approximately 100 microns in thickness and the stainless-steel layer is approximately 300 microns in thickness.

3. The transaction card of claim 1, wherein the first PVC layer comprises a transaction card face printed thereon.

4. The transaction card of claim 1, wherein the aluminum layer comprises 2024-T3 aluminum alloy.

5. The transaction card of claim 4, wherein the aluminum alloy is stripped of exterior paint, rolled to a thickness of approximately 100 microns, and tempered.

6. The transaction card of claim 1, further comprising:
   a second PVC layer adjacent to the ferrite layer on an opposing side relative to the stainless-steel layer, wherein the second PVC layer comprises a transaction card backing printed thereon.

7. The transaction card of claim 6, further comprising a magnetic stripe layer adjacent to the second PVC layer on an opposing side relative to the ferrite layer, wherein the magnetic stripe layer comprises a magnetic stripe in which transaction card data is encoded.

8. A transaction card, comprising:
   an aluminum layer;
   a stainless-steel layer adjacent to the aluminum layer;
   a chip disposed within the aluminum layer; and
   a wireless integrated circuit disposed within an antenna layer, the antenna layer separated from the stainless-steel layer by a ferrite layer and wherein the wireless integrated circuit is configured to wirelessly communicate with a payment terminal on behalf of the chip disposed within the aluminum layer.

9. The transaction card of claim 8, wherein the aluminum layer is approximately 100 microns in thickness and the stainless-steel layer is approximately 300 microns in thickness.

10. The transaction card of claim 8, wherein the aluminum layer comprises a transaction card face printed thereon.

11. The transaction card of claim 8, wherein the aluminum layer comprises 2024-T3 aluminum alloy.

12. The transaction card of claim 11, wherein the aluminum alloy is stripped of exterior paint, rolled to a thickness of approximately 100 microns, and tempered.

13. The transaction card of claim 8, further comprising:
    a second PVC layer adjacent to the ferrite layer on an opposing side relative to the stainless-steel layer, wherein the second PVC layer comprises a transaction card backing printed thereon.

14. The transaction card of claim 13, further comprising a rear laminate layer adjacent to the second PVC layer on an opposing side relative to the ferrite layer, wherein the rear laminate layer comprises a magnetic stripe in which transaction card data is encoded.

15. A method of fabricating a card body for a transaction card, comprising:
    obtaining a portion of aluminum recycled from an airframe;
    fabricating an aluminum layer from the portion of aluminum;
    attaching the aluminum layer to a stainless-steel layer;
    attaching the aluminum layer to a first polyvinyl chloride layer (PVC) adjacent to on an opposing side relative to the stainless-steel layer;

placing a chip within the first PVC layer; and inserting a wireless integrated circuit within an antenna layer, the antenna layer separated from the stainless-steel layer by a ferrite layer, and wherein the wireless integrated circuit is configured to wirelessly communicate with a payment terminal.

16. The method of claim 15, further comprising rolling the portion of aluminum to a thickness of approximately 100 microns.

17. The method of claim 15, further comprising fabricating the stainless-steel layer to a thickness of approximately 300 microns.

18. The method of claim 15, further comprising:

attaching a second PVC layer adjacent to the ferrite layer on an opposing side relative to the stainless-steel layer, wherein the second PVC layer comprises a transaction card backing printed thereon.

19. The method of claim 18, further comprising:

attaching a rear laminate layer adjacent to the second PVC layer on an opposing side relative to the ferrite layer, wherein the rear laminate layer comprises a magnetic stripe in which transaction card data is encoded.

20. The method of claim 15, wherein fabricating the aluminum layer from the portion of aluminum further comprises cutting an ID-1 compliant sized piece of aluminum from the portion of aluminum.

* * * * *